(12) United States Patent
McFadyen

(10) Patent No.: US 7,296,337 B2
(45) Date of Patent: Nov. 20, 2007

(54) NOTCHED TRAILING SHIELD FOR PERPENDICULAR WRITE HEAD

(75) Inventor: Ian Robson McFadyen, San Jose, CA (US)

(73) Assignee: Hitachi Global Storage Technologies Netherlands B.V. (NL)

( * ) Notice: Subject to any disclaimer, the term of this patent is extended or adjusted under 35 U.S.C. 154(b) by 641 days.

(21) Appl. No.: 10/853,805

(22) Filed: May 25, 2004

(65) Prior Publication Data

US 2005/0264931 A1    Dec. 1, 2005

(51) Int. Cl.
*G11B 5/127* (2006.01)
*H04R 31/00* (2006.01)

(52) U.S. Cl. .............. 29/603.16; 29/603.13; 29/603.15; 29/603.18; 216/22; 216/39; 216/41; 360/121; 360/122; 360/126; 360/317; 451/5; 451/41

(58) Field of Classification Search ........... 29/603.11, 29/603.13–603.16, 603.18; 216/22, 39, 41, 216/48; 360/121, 123, 126, 317; 451/5, 451/41
See application file for complete search history.

(56) References Cited

U.S. PATENT DOCUMENTS

| | | | |
|---|---|---|---|
| 4,636,897 A | 1/1987 | Nakamura et al. | 360/119 |
| 4,710,838 A | 12/1987 | Jahnke | 360/125 |
| 4,987,510 A | 1/1991 | Schewe et al. | 360/126 |
| RE33,949 E | 6/1992 | Mallary et al. | 360/110 |
| 5,920,449 A | 7/1999 | Tagawa | 360/122 |
| 6,054,023 A | 4/2000 | Chang et al. | 204/192.2 |
| 7,120,988 B2 * | 10/2006 | Le et al. | 29/603.07 |
| 7,120,989 B2 * | 10/2006 | Yang et al. | 29/603.12 |
| 2002/0176214 A1 | 11/2002 | Shukh et al. | 360/317 |
| 2003/0137770 A1 | 7/2003 | Ueyanagi | 360/126 |
| 2003/0151850 A1 | 8/2003 | Nakamura et al. | 360/125 |
| 2003/0189786 A1 | 10/2003 | McGeehin et al. | 360/126 |

FOREIGN PATENT DOCUMENTS

| | | | |
|---|---|---|---|
| JP | 60247815 | | 12/1985 |
| JP | 62-110714 U | | 7/1987 |
| JP | 1039614 | | 2/1989 |
| JP | 1048217 | | 2/1989 |
| JP | 3100911 | | 4/1991 |
| JP | 3241511 | | 10/1991 |
| JP | 06068461 A | * | 3/1994 |
| JP | 2001266310 | | 9/2001 |
| JP | 2002092820 | | 3/2002 |

* cited by examiner

*Primary Examiner*—Paul D Kim
(74) *Attorney, Agent, or Firm*—Silicon Valley Patent Group LLP; Omkar K. Suryadevara

(57) ABSTRACT

During fabrication of a perpendicular write head in a wafer, at least two sides of a write pole are defined (e.g. by ion milling) while a third side of the write pole is protected by a masking material. At this stage, a material that is to be located in the write gap is already present between the write pole and the masking material. After definition of the write pole surfaces, a layer of dielectric material is deposited. During this deposition, the masking material is still present. Thereafter, the masking material (and any dielectric material thereon) is removed, to form a hole in the dielectric material. Next, a trailing shield is formed in the structure, so that at least one portion of the trailing shield is located in the hole, and another portion of the trailing shield is located over the dielectric material, in an area adjacent to the hole. Note that the gap material is now sandwiched between the portion of the trailing shield in the hole, and the write pole.

14 Claims, 6 Drawing Sheets

NOTCHED TRAILING SHIELD FOR PERPENDICULAR WRITE HEAD

FIELD OF THE INVENTION

The present invention is directed to magnetic recording and more specifically to a notched trailing shield for perpendicular recording.

BACKGROUND

Perpendicular write heads are well known in the art. For example, U.S. Pat. RE 33,949 granted to Mallary et al. describes a vertical recording arrangement in which a downstream magnetic shield is integrally formed with a write pole section having a tip to make up the magnetic recording head. This patent is incorporated by reference herein in its entirety. Mallary states that the face of his shield is designed to be many times as large as the face of the write pole section. Hence Mallary's shield appears to serve as a return path for the magnetic flux. In contrast, a single pole write head design uses a return path pole that is located far away, while using a trailing edge adjacent to the single pole to intercept magnetic flux fringing from the single pole. See for example, U.S. Pat. No. 5,920,449 granted to Tagawa that is also incorporated by reference herein in its entirety.

It is possible to fly longitudinal heads backwards to write perpendicular media. Such heads may have a notched pole tip. However, there appears to be no known description of how a notched trailing shield is to be fabricated for a perpendicular write head as discussed below.

SUMMARY OF THE INVENTION

During fabrication of a perpendicular write head in several embodiments of the invention, at least two sides of a write pole are defined (e.g. by ion milling) while a third side of the write pole is protected by a masking material. At this stage, a material that is to be located above the pole (also called "gap material") is already present between the write pole and the masking material. After definition of the write pole surfaces, a layer of dielectric material is deposited. During this deposition, the masking material is still present. In some embodiments, the masking material is used as a shadow mask during dielectric deposition, so that the dielectric layer forms a valley adjacent to the masking material. Thereafter, the masking material (and any dielectric material thereon) is removed (e.g. by mechanical shearing) to form a hole in the dielectric material. This structure, of a valley with a hole therein, is used as a form into which a magnetic material is deposited to form a trailing shield or alternatively a non-magnetic material is deposited to form a pseudo-trailing shield which is later recessed from an air bearing surface followed by deposition of trailing shield material.

A trailing shield resulting from the above-described process has at least one portion of the trailing shield located in the hole, and another portion of the trailing shield is located over the dielectric material, in an area adjacent to the hole. The gap material is now sandwiched between the portion of the trailing shield in the hole, and the write pole. Note that since the same masking material that is used during definition of the write pole is also used to form the hole in which a portion of the trailing shield is located, the write pole and the trailing shield are automatically aligned to one another.

DETAILED DESCRIPTION

Figure 1:
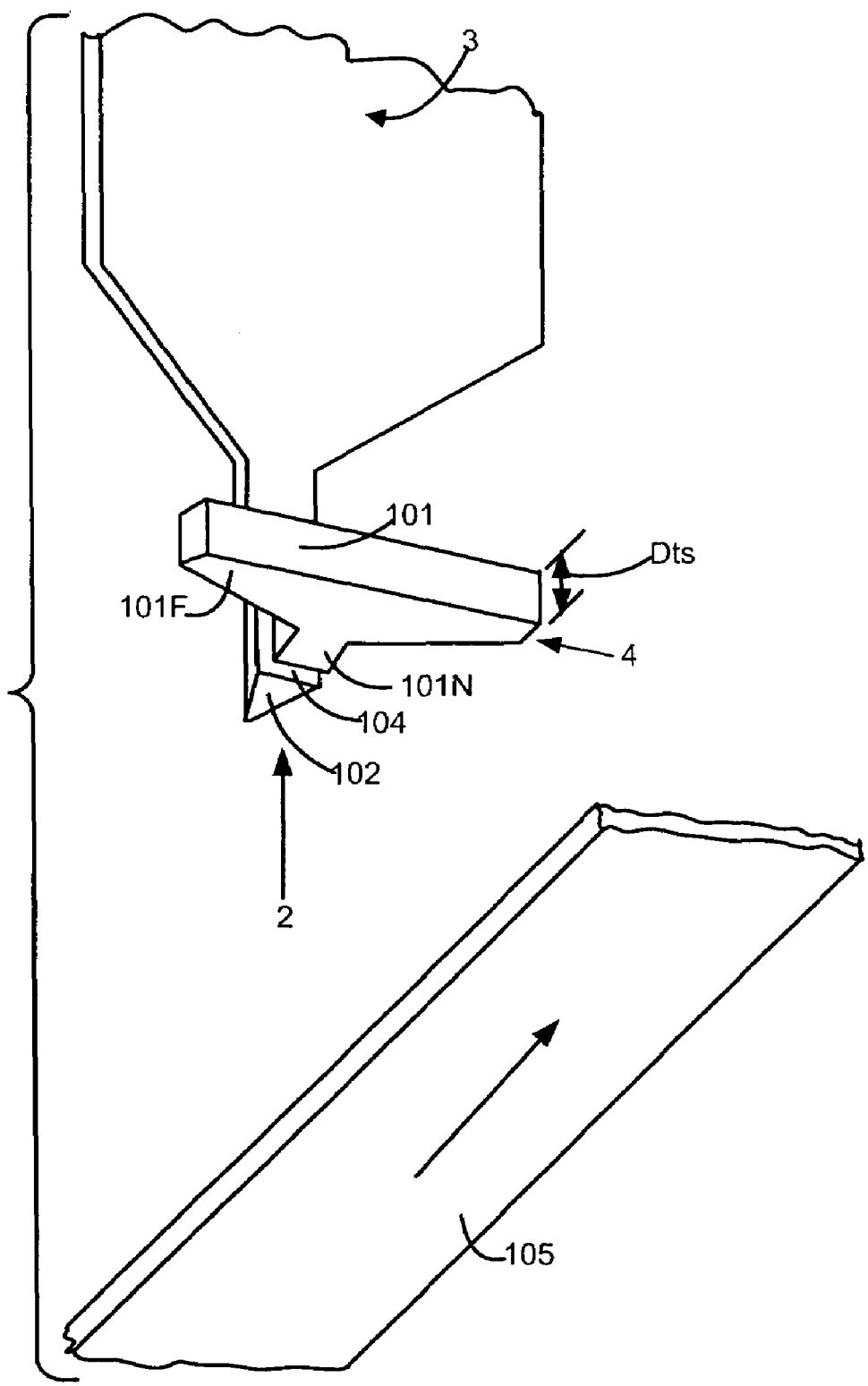
FIG. 1 illustrates, in a three dimensional perspective view, a single pole notched write head with a notched trailing shield being used for perpendicular recording on a magnetic medium in accordance with the invention.

A single pole notched write head in several embodiments of the invention has a pole tip 102 (FIG. 1) and a notched trailing shield 101 that is located adjacent thereto. As shown in FIG. 1, shield 101 has a notched portion 101N that is separated from pole tip 102 by a small gap 104. Shield 101 also has another portion 101F that, in some embodiments, is formed integrally with and connected to notched portion 101N. During normal operation, magnetic flux from pole tip 102 fringes substantially vertically downwards (opposite to direction 2) to record information into media 105, in the manner normal for a perpendicular write head. Shield 101 has a depth Dts (see FIG. 1) from the air bearing surface.

Figure 2A:
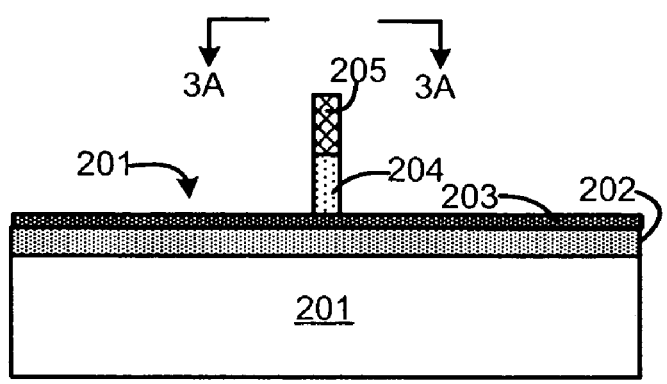
FIGS. 2A-2E illustrate, in plan views, when viewed in direction 2 in FIG. 1, a process for forming a notched trailing shield in some embodiments of the invention.

Notched trailing shield 101 is fabricated in many embodiments of this invention starting with a structure 200 of the type illustrated in FIG. 2A. Specifically, structure 200 includes a layer 201 of dielectric material such as alumina over which is located a layer 202 of magnetic material that is to form pole tip 102. Structure 200 also includes another layer 203 of dielectric material that is to be located above the pole (also called "gap material"). In many embodiments, the just-described layers 201-203 extend across most areas of a wafer which is being processed to form numerous write heads.

Figure 3A:
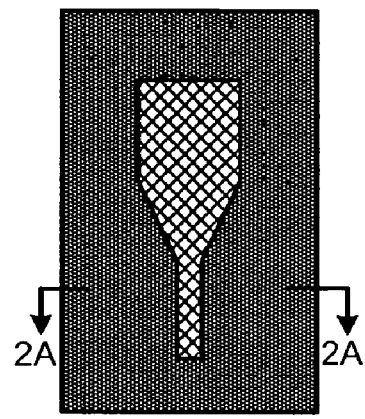
FIGS. 3A-3E illustrate, elevation views in direction 3 in FIG. 1, the process illustrated in FIGS. 2A-2E.

In addition, structure 200 that is to form a single write head also includes a layer 204 of masking material (such as Durimide) and a layer 205 of photoresist that is used to etch layer 204 into an appropriate shape, of the type illustrated in FIG. 3A. Note that FIG. 3A illustrates an elevation view in the direction 3A-3A of FIG. 2A (and also in the direction 3 in FIG. 1). Structure 200 may be formed by performing any of a number of fabrication steps well known in the art as described in, for example, US patent application entitled "Perpendicular Pole Tip And Method Of Fabrication" by Richard Hsiao, Wipul Pemsiri Jayaekara and Jeffrey S. Lille, with filing date Feb. 23, 2004 and application Ser. No. 10/785,236. This patent application is incorporated by reference herein in its entirety. The specific manner in which structure 200 is formed is not a critical aspect of the current invention.

Figure 2B:
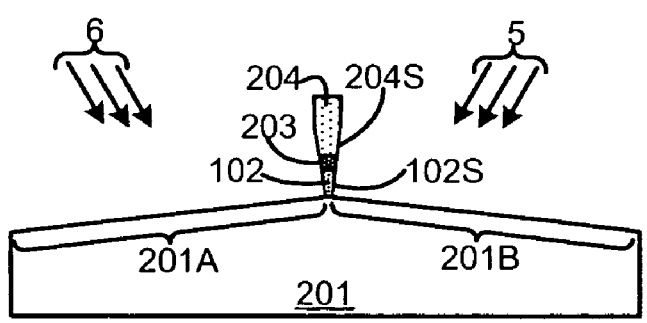
Figure 3B:
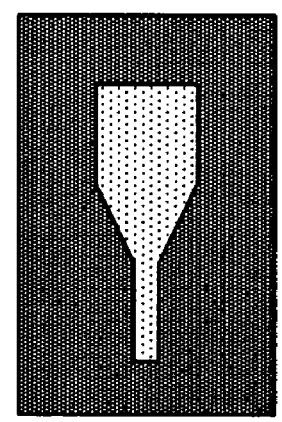

Next, the photo resist in layer 205 is stripped off, and ion milling is performed, as shown in directions 5 and 6 of FIG. 2B. Ion milling removes dielectric material layer 203 and also removes the magnetic material layer 202 (FIG. 2A) in all areas outside of the above-described shape. Moreover, depending on the angle at which ion milling is performed (e.g. 10 degrees) most of the magnetic material of layer 202 underneath masking material layer 204 remains intact except for small portions that are removed from the two sides of pole tip 102 (thereby notching the pole tip 102).

Note that the above-described ion milling defines not only the two sides of pole tip 102 but also the two sides of masking material layer 204 (and also two sides of dielectric material layer 203), thereby to make them coplanar with one another. Specifically, as illustrated in FIG. 2B, side 102S of pole tip 102 is made coplanar with side 204S of masking material layer 204 because these two sides 102S and 204S are formed simultaneously by the same process (ion milling in this example) in the direction 5. Note that the same observation is true for direction 6. Such co-planarity of the sides of pole tip 102 and the sides of masking material layer 204 ensures that pole tip 102 is automatically aligned with a notched portion of a trailing shield (formed as discussed below).

Thereafter, the milled areas 201A and 201B of layer 201 are refilled by depositing a layer 207 of dielectric material such as alumina, e.g. by performing angled Ion Beam Deposition (IBD) which is a technique well known to the skilled artisan. During IBD, an ion beam is used to sputter alumina from a target. The plume of species sputtered from the target impinge on the substrate or wafer at an angle of between 10 and 70 degrees with respect to the wafer normal. Note that during the alumina deposition step, mask material layer 204 is still in place, and hence the profile of alumina surface being formed is affected by a shadow cast by mask material layer 204, as well as the deposition angle. Hence, mask material layer 204 acts as a shadow mask relative to a direction 7 from which alumina deposition occurs. Needless to say, the surfaces of layer 207 in contact with mask material layer 204 conform to its sides (e.g. side 204S in FIG. 2B) defined by ion milling. Note that direction 7 is shown in FIG. 2C by only two sets of inclined arrows (from the left and from the right), although during alumina deposition the wafer's normal is tilted with respect to direction 7 and the wafer is rotated about the wafer normal.

Specifically, the mask material layer 204 causes layer 207 of dielectric material to be formed in a three-part profile as described next. A first part 207A is distant from pole tip 102, and is fully exposed to the deposition, so that it has uniform thickness. A second part 207B is located within a shadow of mask material 204 and hence it is not fully exposed to deposition. Hence although second part 207B is of the same thickness as first part 207A at locations adjacent thereto, second part 207B becomes gradually thinner as pole tip 102 is reached. For this reason, second part 207B forms a valley around the mask 204. Finally, layer 207 also includes a third part 207C that is formed on the almost vertical (although angled) sides of and also over the mask material layer 204.

Figure 2C:
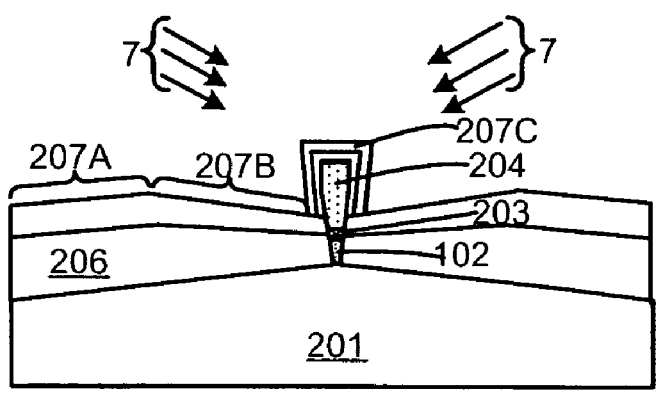
Figure 3C:
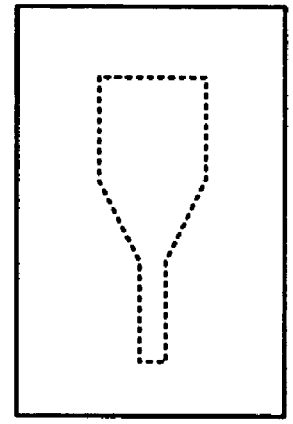

In FIG. 2C, layer 207 is shown as being located over another layer 206 which is also formed of dielectric material, e.g. also alumina. One difference between layers 206 and 207 is that layer 206 is formed first, and it is adjacent to the pole tip 102 and layer 207 is formed next and it is adjacent to gap material layer 203 and mask material layer 204. Note that depending on the embodiment, only one layer could be used (in place of layers 206 and 207 shown in FIG. 2C), although in many embodiments two layers are used to allow for dielectrics with different properties to be deposited immediately adjacent to the regions 201A and 201B and further from it. The number of layers of dielectric are not a critical aspect of the invention.

Figure 2D:
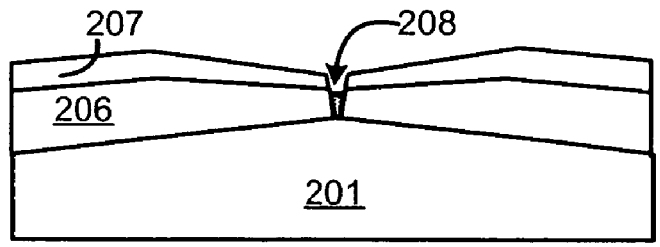
Figure 3D:
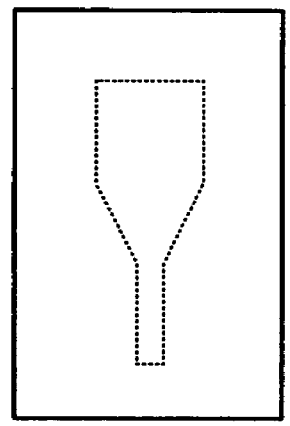

Now referring to FIG. 2D, the mask material 204 is next removed, as well as any dielectric material thereon (i.e. the third part of layers 206 and 207) is removed, leaving a hole 208 (see FIG. 2D) at the former location of the mask material. In many embodiments, this removal is performed by chemical mechanical polishing (CMP) wherein mask material layer 204 (and layers 206 and 207 thereon) are mechanically sheared off. At this stage, in some embodiments gap material 203 (FIG. 2C) is exposed at the bottom of hole 208 (FIG. 2D). Gap material 203 may be selected to have an appropriate property to act as a stop for the removal process. Note that although in some embodiments, the same material, e.g. carbon may be used as gap material and also as CMP stop, in alternative embodiments, there are two layers, wherein an upper layer acts as a stop for the removal process and a lower layer fills the write gap.

At this stage, hole 208 has two sides (that are almost vertical but angled) formed of dielectric material (e.g. of layers 206 and 207) and hence hole 208's sides are also coplanar with the sides of write pole 102. Note that in order for the above-described mechanical shearing off to happen, the thickness of layers 206 and 207 is kept sufficiently small (i.e. a sufficient portion of the item to be sheared off is elevated over the surrounding region). For more details, see U.S. patent application Ser. No. 10/785,236 which was incorporated by reference above.

Figure 2E:
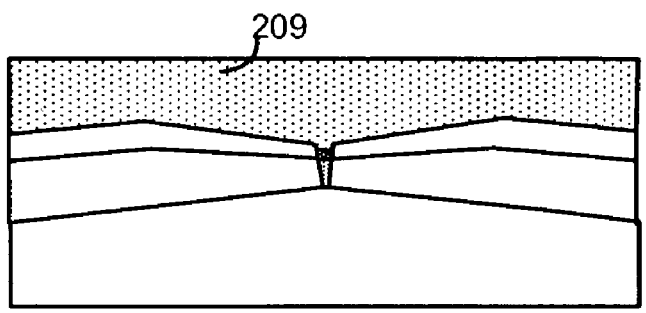
Figure 3E:
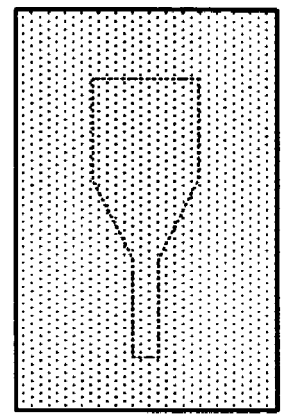

Next, gap material layer 203 is removed to the extent necessary. Thereafter, a layer 209 (FIG. 2E) of magnetic material that is to form the trailing shield is placed in the hole 208 and also over the dielectric layer 207 thereby to form the notched trailing shield 101 (FIG. 1). Note that since the mask material layer 204 was used twice (a) once to define the sides of the pole tip 102 and (b) another time to define the shape of the valley and to form the hole 208 (FIG. 2D), for this reason corresponding two portions of the trailing shield 101 become self aligned relative to the underlying pole tip 102. Specifically, a notched portion of trailing shield 101 is located inside hole 208, and this notched portion has sides that are coplanar with the corresponding sides of write pole 102. Moreover, another portion of the trailing shield 101 is located over the dielectric material in an area adjacent to hole 208, and this portion has sides defined by the above-described valley.

Figure 2F:
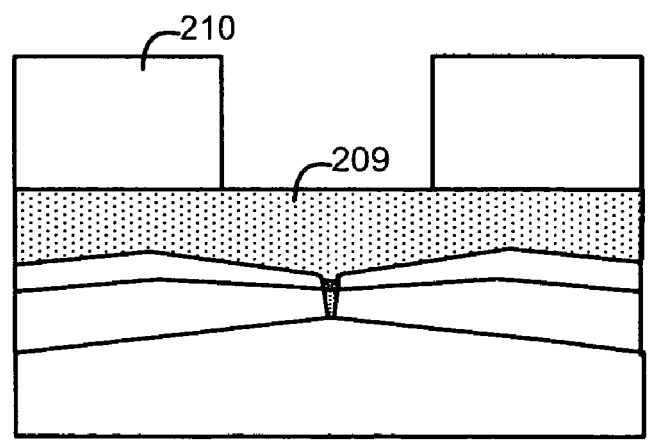
FIGS. 2F-2H and FIGS. 3F-3H illustrate an alternative embodiment of the process illustrated in FIGS. 2A-2E and FIGS. 3A-3E wherein a non-magnetic pseudo trailing shield is first formed followed by etching and deposition of the trailing shield material.
Figure 3F:
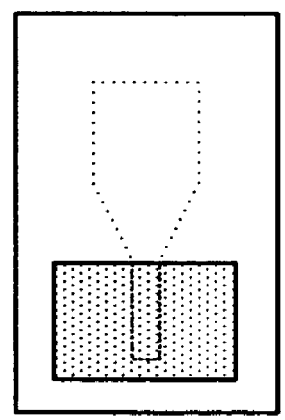
Figure 2G:
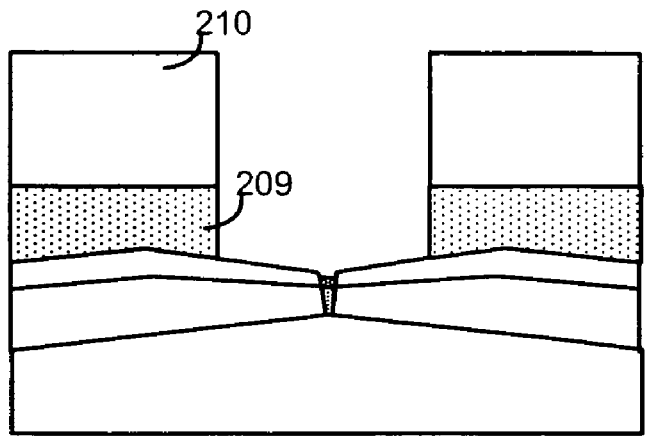
Figure 3G:
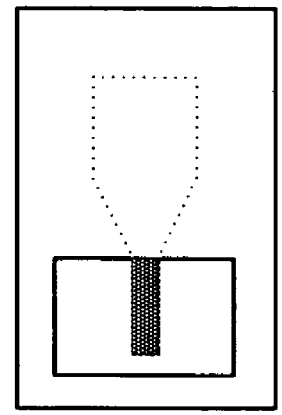
Figure 2H:
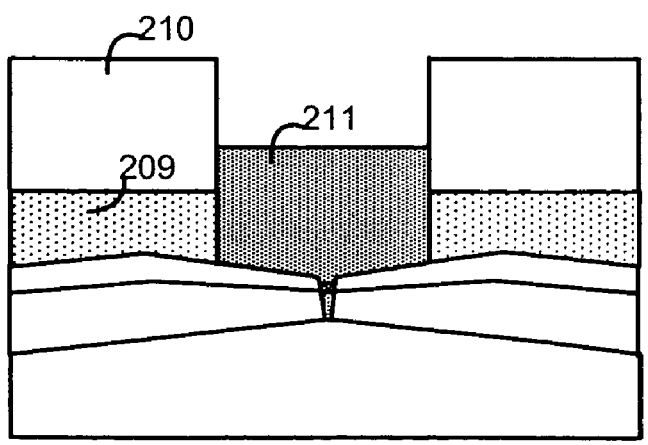
Figure 3H:
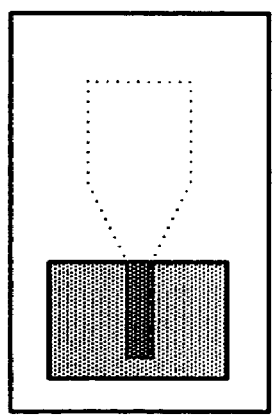

In some alternative embodiments, instead of depositing magnetic material (in hole 208 and in areas adjacent to hole 208) over the structure in FIG. 2D, a layer 209 (see FIG. 2E) of non-magnetic material that is dry etchable is deposited thereon. This layer 209 is also referred to herein as a "pseudo" trailing shield. Next, a layer 210 (see FIG. 2F) of photoresist is formed and patterned appropriately for a specific shape that the trailing shield is to have (see FIG. 3F). Then, the exposed portion of the pseudo trailing shield is removed, by reactive ion etching (RIE), followed by deposition of the magnetic material 211 (FIG. 2G) that is to form the trailing shield 101 (FIG. 1). Material 211 may be deposited in any manner well known to the skilled artisan, e.g. by sputtering or by plating. If sputtering is used, then an additional CMP step may be necessary to remove the magnetic material from unwanted areas (e.g. over photoresist 210).

Figure 4A:
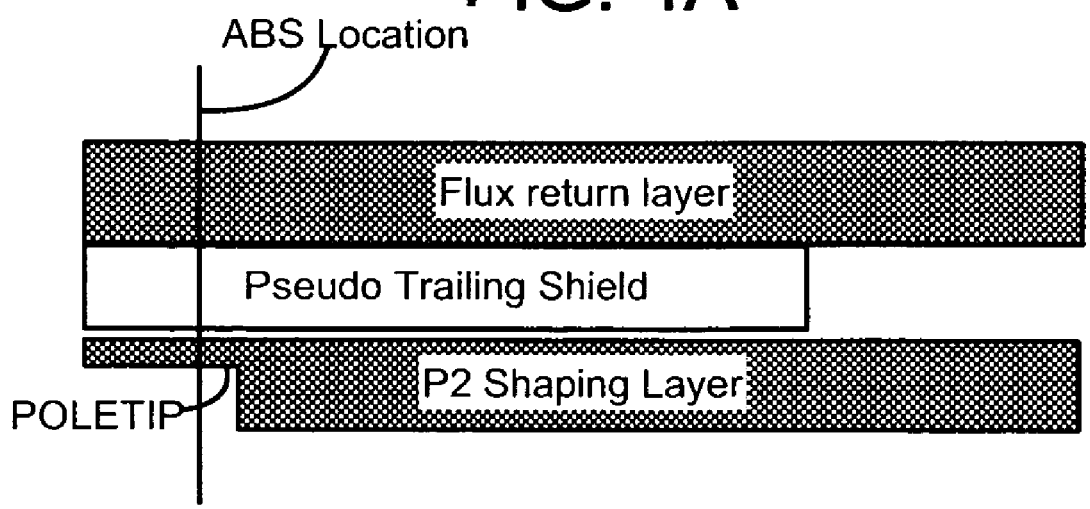
FIGS. 4A and 4B illustrate, in side views in direction 4 in FIG. 1, replacement of pseudo trailing shield material with magnetic material used to form the trailing shield in the alternative embodiment of FIGS. 2F-2H and FIGS. 3F-3H.
Figure 4B:
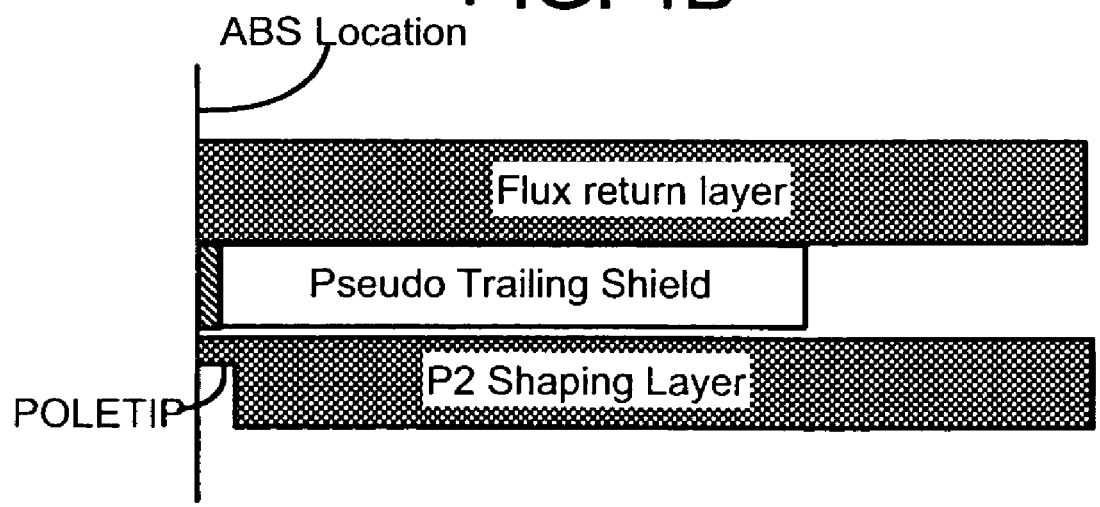

In one alternative embodiment, a "pseudo" trailing shield is created as described above in reference to FIGS. 2D-2F, followed by cutting the wafer into rows, and lapping to expose the air bearing surface (see FIGS. 4A and 4B). In such an embodiment, lapping may be stopped (to define the air bearing surface) based on the read sensor performance or resistance. Once the air bearing surface is defined, a mask is used to protect the read sensor and open up a window around the pseudo trailing shield. Note that the mask may be "non critical" because the dimension of the feature is determined by the material being etched out—the pseudo shield. The mask simply has to cover other areas which may be sensitive to the etch chemistry, such as the sensor. For more details, see U.S. patent application entitled "Perpendicular Magnetic Recording Head Built Using An Air-Bearing Surface Damascene Process" by Ian Robson McFadyen, Neil Leslie Robertson and Scott MacDonald, filing date Feb. 16, 2004 and application Ser. No. 10/778,265 which is incorporated by reference herein in its entirety.

Thereafter, the pseudo trailing shield is recessed from the air bearing surface using reactive ion etching that is selective to the pseudo trailing shield material. (e.g. F RIE which is well known to the skilled artisan as Reactive Ion Etching using Fluorine based chemistry, and which can be used to selectively remove Ta (Tantalum), W (Tungsten) or Si (Silicon) materials). The amount of recess, Dts (FIG. 1) is selected based on the depth to which the trailing shield 102 is to extend from the air bearing surface. Next, a desired magnetic material is vacuum deposited into the recess, and onto the air bearing surface and/or resist. Then light kiss polish or CMP is performed to remove the magnetic material outside of the recess.

In the just-described process, optionally, a polish or CMP stop layer can be deposited prior to the magnetic material. This stop layer provides more process tolerance in the CMP (Chemical Mechanical Polishing) process. Furthermore, an adhesion promotion layer (Cr, NiCr, . . . ) could be applied prior to magnetic material deposition.

Although the present invention is illustrated in connection with specific embodiments for instructional purposes, the present invention is not limited thereto. Various adaptations and modifications may be made without departing from the scope of the invention. For example, although two or more layers (such as layers 201 and 202 shown in FIG. 2A) are in contact with one another in some embodiments, in other embodiments one or more additional layers are present therebetween. As another example, the trailing shield throat height can be defined either after the air bearing surface is formed or during wafer fabrication. Therefore, the spirit and scope of the appended claims should not be limited to the foregoing description.

What is claimed is:

1. A method of fabricating a perpendicular write head in a wafer, the method comprising:

defining at least two sides of a write pole, while a third side of the write pole is protected by a masking material, wherein a gap material is located between the write pole and the masking material;

depositing a layer of dielectric material over at least one surface formed during said defining;

removing the masking material to expose the gap material, the gap material being located in a hole in the dielectric material; and forming a trailing shield comprised of at least a first portion located in the hole, and a second portion located above the dielectric material, in an area adjacent to the hole;

wherein the first portion of the trailing shield is physically separated from the write pole by the gap material.

2. The method of claim 1 wherein the layer of dielectric material is thinner in said area adjacent to the hole than at locations distant from the hole, and a surface of the dielectric material in said area is defined by a shadow of the masking material during deposition of the dielectric material.

3. The method of claim 1 wherein the masking material is removed by mechanical shearing.

4. The method of claim 3 further comprising chemical mechanical polishing, wherein the mechanical shearing occurs during chemical mechanical polishing.

5. The method of claim 4 wherein the gap material comprises carbon, and the carbon is used as a stop for the chemical mechanical polishing.

6. The method of claim 5 further comprising:

removing at least a portion of the carbon, after the chemical mechanical polishing.

7. The method of claim 1 wherein said defining comprises ion milling at a predetermined angle, or angles, relative to a surface of the masking material.

8. The method of claim 7 wherein:

said ion milling removes magnetic material in areas not protected by the masking material.

9. The method of claim 1 wherein said layer of dielectric material is deposited by angled ion beam deposition with the masking material still in place.

10. The method of claim 9 wherein presence of the masking material during deposition of the layer of dielectric material causes the layer of dielectric material to be formed in a profile comprised of:

a first part that is distant from the write pole and has uniform thickness;

a second part that is located within a shadow of the masking material and has the same thickness as the first part at locations adjacent thereto but becomes gradually thinner as the write pole is reached; and a third part that is formed on vertical sides of and over the masking material.

11. The method of claim 1 wherein the trailing shield comprises a magnetic material and the method further comprises:

prior to forming the trailing shield, depositing a nonmagnetic material to form a pseudo trailing shield at least in the hole, and reactive ion etching of the pseudo trailing shield.

12. The method of claim 11 wherein the trailing shield is formed by sputtering a predetermined material.

13. The method of claim 12 further comprising:

chemical mechanical polishing to remove the predetermined material from at least one unwanted area.

14. The method of claim 1 further comprising:

cutting the wafer into rows; and lapping to expose an air bearing surface.

* * * * *